United States Patent [19]

Donig et al.

[11] 4,063,302
[45] Dec. 13, 1977

[54] PROTECTION ARRANGEMENT FOR AN INVERTER

[75] Inventors: Gerhard Donig, Erlangen; Manfred Müller, Nurnberg, both of Germany

[73] Assignee: Siemens Aktiengesellschaft, Berlin and Munich, Germany

[21] Appl. No.: 668,927

[22] Filed: Mar. 22, 1976

[30] Foreign Application Priority Data

Mar. 25, 1975 Germany .............................. 2513227

[51] Int. Cl.² .......................................... H02H 7/122
[52] U.S. Cl. ...................................... 361/90; 361/91; 361/104; 363/56; 363/159
[58] Field of Search ...................... 317/31, 40 A, 40 R, 317/335 C, 27 R; 321/11, 12, 14, 18; 340/250; 361/88, 89, 90, 91, 92, 104, 86

[56] References Cited

U.S. PATENT DOCUMENTS

| 3,394,299 | 7/1968 | Lawn et al. | 321/11 |
| 3,530,360 | 9/1970 | Relation | 317/40 A X |
| 3,546,692 | 12/1970 | Salzer | 340/250 |
| 3,852,656 | 12/1974 | Bourbeau | 321/11 |
| 3,890,562 | 6/1975 | West | 321/18 X |
| 3,947,748 | 3/1976 | Klein | 321/11 |

*Primary Examiner*—J D Miller
*Assistant Examiner*—Patrick R. Salce
*Attorney, Agent, or Firm*—Kenyon & Kenyon, Reilly, Carr & Chapin

[57] ABSTRACT

A protection arrangement for an inverter having fuses connected in series with its d-c inputs is disclosed. In particular, in one form of the arrangement, an electronic voltage monitoring device is provided for monitoring the input d-c voltage to the inverter at the connection points of the inverter inputs and the fuses. If the voltage monitored by the monitoring device falls below a predetermined level, the monitoring device delivers a protection signal to the control unit of the inverter directing the latter to release firing pulses for extinguishing the valves in the valves branches of the inverter.

In another form of the arrangement, the voltage monitoring device monitors the voltage across each of the fuses at the d-c inputs of the inverter, and, if a monitored voltage exceeds a predetermined value, delivers a protection signal to the control unit of the inverter.

Additionally, where the inverter being protected is included in a cycloconverter, provision is made for ensuring that a protection signal is not delivered before sufficient time has elapsed for the intermediate d-c link voltage of the converter to reach a predetermined value.

7 Claims, 5 Drawing Figures

PROTECTION ARRANGEMENT FOR AN INVERTER

BACKGROUND OF THE INVENTION

1. Field of the Invention

The invention relates to a protection arrangement for an inverter having fuses connected in series with its d-c inputs.

2. Description of the Prior Art

For converter installations which comprise a rectifier, an intermediate circuit and an inverter, an arrangement for protection against overvoltages is already known from German Pat. No. 911,034. In particular, in the aforesaid protection arrangement if an overvoltage occurs in the intermediate circuit due to a defect in the rectifier, this overvoltage is rendered harmless by a spark gap, by firing additional valves in the rectifier or by firing the rectifier valves. Thus, the latter protection arrangement is suited only for protecting for overvoltages in the intermediate link of a cycloconverter.

In inverters, on the other hand, in the event of a break in or failure of the d-c input voltage, the ability to fire and extinguish the valve branches for commutation is reduced. Typically such a break in or failure of the d-c input voltage occurs when a fuse in one of the d-c inputs of the inverter blows. In particular, in such case, there can develop in the semiconductor elements of the inverter, via an unblown fuse, an excessively high voltage or current leading to the destruction of the semiconductor elements within a very short time. Mechanical protection devices, therefore, cannot be used to reliably protect the inverter.

It is an object of the present invention to provide a protection arrangement for an inverter which protects the valve branches of the latter in the event of a break in or failure of the d-c input voltage.

SUMMARY OF THE INVENTION

In accordance with the principles of the present invention, the above and other objectives are accomplished by a protection arrangement including an electronic voltage monitoring arrangement for monitoring the d-c input voltage to the inverter to be protected. More particularly, when the voltage input to the inverter falls below a predetermined value the monitoring arrangement generates a protection signal which signals the control unit of the inverter to release firing pulses for the valve branches of the latter. Specifically, when a fuse of the inverter responds, the monitoring arrangement immediately ascertains that a break in the d-c input voltage of the inverter has occured. Moreover, by setting the response value of the voltage monitoring arrangement at an appropriate margin below the d-c input voltage occurring in undisturbed operation, the response value is not reached in undisturbed operation.

In another embodiment of the protection arrangement which is to be used for protecting the inverter of a cycloconverter which additionally contains a rectifier and an intermediate circuit, the protection arrangement further includes a blocking gate which is fed the signal from the monitoring arrangement. The latter gate, in turn, is controlled to cut-off for a predetermined duration during starting-up of the cycloconverter or as a function of the output signal of a voltage indicator for the intermediate link d-c voltage.

In the latter case of an inverter employed in a cycloconverter, the intermediate-link d-c voltage builds up at the intermediate-link capacitor with a time constant. The intermediate-link d-c voltage is, therefore, initially below the response value of the voltage monitoring arrangement and exceeds this value only after a given time. Only when the intermediate-link d-c voltage has a predetermined value can the inverter be started. During the time interval required for the intermediate-link d-c voltage in undisturbed operation to rise above the response value of the protection arrangement, the protection signal is blocked by the blocking gate. If at the end of this time interval the intermediate d-c voltage is still below the response value of the voltage monitoring arrangement, the blocking gate releases the protection signal which indicates a defective fuse is present and that the inverter should not be started.

Advantageously, the monitoring of the d-c input voltage to the inverter is accomplished at a point between the fuses and the d-c inputs of the inverter. A voltage break, if a fuse responds, is usually more pronounced at a point behind the fuse and can, therefore, be ascertained more easily at such point than at a point ahead of the fuse. Ascertaining the input voltage at a point behind the fuses of the inverter is advantageous also where several inverters are connected to a d-c bus or to one intermediate d-c link. If one fuse of an inverter blows, the other inverters can continue to operate undisturbed.

In a further aspect of the invention, the electronic voltage monitoring device monitors the voltage drop across each fuse and delivers a protection signal if a predetermined value is exceeded. More specifically, in undisturbed operation, the voltage drop across a fuse is practically zero, as the fuse has a very low ohmic resistance. At the instant a fuse blows, a voltage spike is generated which is ascertained by the electronic voltage monitoring device and is converted into a protection voltage. Since each individual fuse is monitored separately, a direct indication of each fuse is possible. Also by selecting the impedance of the input circuit of the monitoring arrangement to be high, no appreciable current flows through the circuit.

The embodiments of the invention are thus based on the fact that a rapid voltage change is obtained when a fuse in the d-c inputs of an inverter responds (blows). This voltage change can, thus, be ascertained by an electronic voltage monitoring device whose output can, in turn, be used to influence the control unit of the inverter to release firing pulses for the valve branches of the latter. In particular, protection of the valve branches can be realized by delivering firing pulses to the quenching valves or to all main valves. In this manner, immediate protection of the valve branches is achieved, as no excessive overcurrents or overvoltages which might lead to the destruction of the semiconductor elements of the valve branches are produced.

A protection arrangement suitable for the present invention may comprise a voltage monitoring device which includes a threshold member, the output signal of which is converted into a protection signal via a potential-free transmission device. Advantageously, a Zener diode may be used as the threshold member. Also advantageously, an opto-electronic coupler may be employed as the potential-free transmission device. Such a coupler permits complete potential separation with high dielectric strength. Additionally, increased dielectric strength can be realized by separating the light-emitting and the light-sensitive semiconductor elements of the opto-electronic coupler with light guides.

The protection arrangement according to the invention is completely free of wear, is not subject to being soiled and needs no maintenance. Also, is not subject to contact burn-off and causes no interference due to arcs.

BRIEF DESCRIPTION OF THE DRAWINGS

The above and other features and aspect of the present invention will become more apparent upon reading the following detailed description in conjunction with the accompanying drawings, in which.

DETAILED DESCRIPTION

Figure 1:
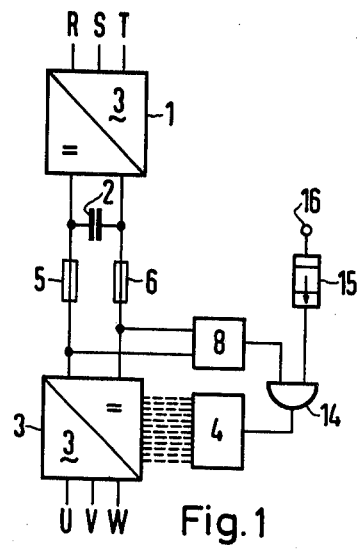
FIG. 1 shows a protection arrangement according to the principles of the present invention.

The cycloconverter shown in FIG. 1 forms from the phases RST of a three-phase network the phases UVW of a further three-phase system, to which, for instance, a rotating-field machine can be connected. As shown, the cycloconverter includes a rectifier 1, an intermediate d-c link illustrated symbolically as a capacitor 2, and an inverter 3 which has valve branches that can be fired and extinguished, and which may preferably be designed as a self commutating inverter.

Associated with the inverter 3 is a control device 4. The latter device generates firing pulses for the main and quenching valves in the valve branches of the inverter. Also associated with the inverter 3 are fuses 5 and 6 which are arranged in the d-c inputs of the inverter. While the fuses 5 and 6 are provided to protect the inverter, under certain conditions they do not adequately do so. Thus, for example, if the fuse 5 blows for any reason during operation, a current is still driven via the still intact fuse 6 and the load (not shown), through the valve branches of the inverter. Before the fuse 6 responds (blows), such a current may build up, at the reversing capacitors in the valve branches, a voltage which is high enough to destroy the valves of the branches. Such destruction may also occur if the current discharges the reversing capacitors in the quenching circuits of the valve branches so that the valves of the branches can no longer be extinguished.

Thus, in order to more fully protect the valves of the inverter from damage there is provided, in accord with the present invention, an additional protection arrangement which includes an electronic voltage monitoring device 8. The latter device monitors the intermediate-link d-c voltage between the terminals of the fuses 5, 6 connected to the inverter inputs. If this voltage falls below a predetermined value, the voltage monitoring device 8 delivers a protection signal to the control device 4, which thereupon transmits firing pulses to the valve branches of the inverter.

In the protection arrangement of FIG. 1, the monitoring device 8 feeds the protection signal to control device 4 via a blocking gate 14. The gate 14 is additionally fed a cut off signal from a delay member 15 which is connected on its input side to a terminal 6 to which is applied a starting command. The delay time of the delay member 15 corresponds to the time it takes during undisturbed operation for the intermediate-link d-c voltage to rise above the response value of the electronic voltage monitoring device 8. During this time, the protection signal is blocked. If at the end of this time interval the protection signal continues to be present, a defect exists. Thus, for example, one of the phases RST may have failed or a fuse may be defective. Under such a condition, the control device 4, in response to the protection signal prevents the inverter 3 from being started up.

Figure 2:
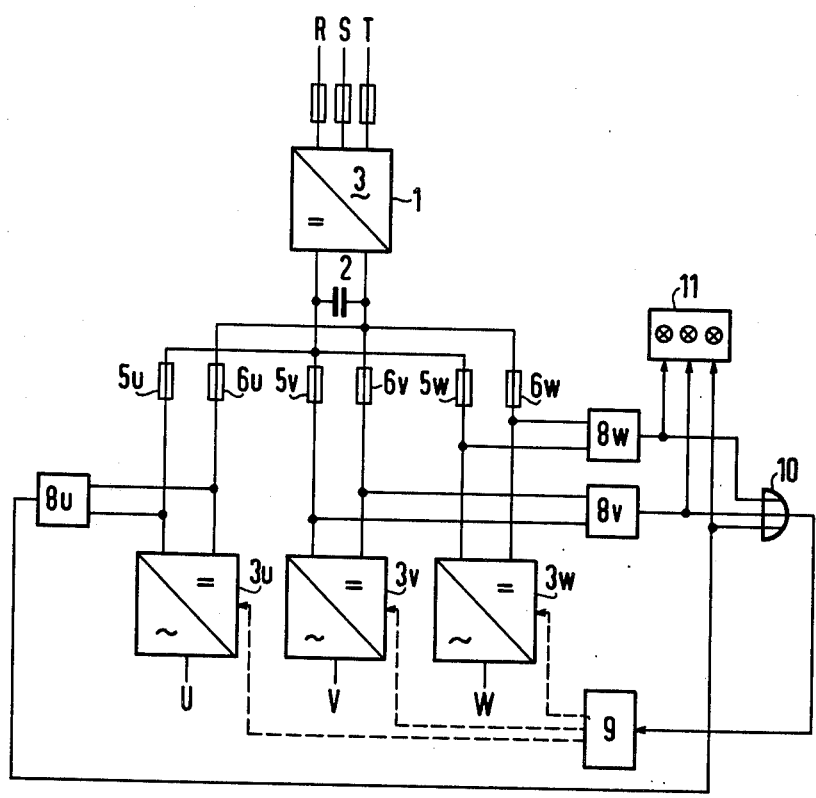
FIG. 2 shows the protection arrangement of FIG. 1 employed for protecting the inverters of several cycloconverters.

FIG. 2 shows a cycloconverter in which the individual phases are separately generated and in which separate protection arrangements, each similar to the arrangement in FIG. 1, are used to monitor each phase. The cycloconverter comprises a rectifier 1, and intermediate d-c link shown illustratively as a capacitor 2 and three inverters 3u, 3v, 3w for generating a three-phase system of voltages with the phases UVW. Connected between the d-c inputs of the three inverters 3u, 3v, 3w and the rectifier 1 are pairs of fuses 5u, 6u; 5v, 6v; and 5w, 6w, respectively. The voltages behind the aforesaid pairs of fuses at the inputs of their respective inverters are monitored by electronic voltage monitoring devices 8u, 8v, 8w. The output signals of these three voltage monitoring devices are, in turn, combined in a logic member 10 whose output forms a protection signal which is fed to the control device 9 for causing the latter to deliver pulses for the valve branches of the inverters.

The output signals of the voltage monitoring devices 8u, 8v, 8w are, in addition, fed to an indicating device 11, which identifies, for example, by luminous indicators which of the fuses have blown.

If it is desired in a specific application to continue to operate the inverter with the remaining phases when one phase fails, the output signals of the voltage monitoring devices 8u, 8v, 8w can be fed via blocking gates. Such gates can be made to block the protection signals via manually applied blocking signals, for example.

As is apparent, the protection arrangement of the invention can be readily adapted to protect the inverters of a cycloconverter having a larger or smaller number of phases than the cycloconverters shown in FIG. 2. Also the protection arrangement can be adapted to protect inverters which are three-phase inverters.

Figure 3:
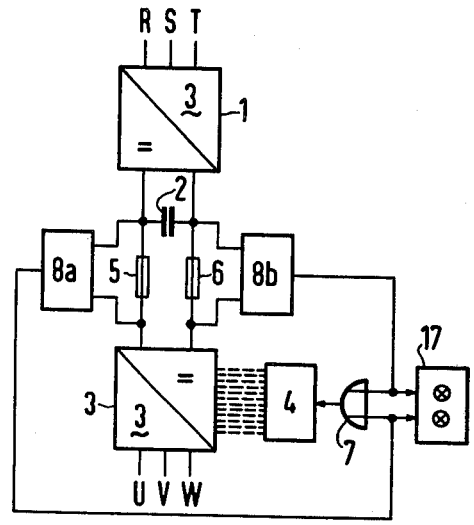
FIG. 3 shows another protection arrangement according to the principles of the present invention.

In FIG. 3, the cycloconverter shown is similar to the cycloconverter of FIG. 1. The protection arrangement, however, has been modified so that it includes an electronic voltage monitoring device for monitoring the voltage drop across each of the two fuses 5 and 6 in the d-c inputs of the inverter 3. In particular, the voltage monitoring devices 8a or 8b are provided for monitoring the voltages across fuses 5 and 6, respectively. If the voltage drop at one of the two fuses exceeds a predetermined value, then the associated voltage monitoring device delivers a protection signal.

The protection signals of the two voltage monitoring devices 8a, 8b are, in turn, combined in a logic member 7. The output signal of member 7 is then applied to the control device 4 for causing the device to release firing pulses for the valve branches of the inverter 3. The protection signals of the two voltage monitoring devices 8a, 8b are additionally fed to an indicating device 17, which indicates directly which fuses have blown.

Figure 4:
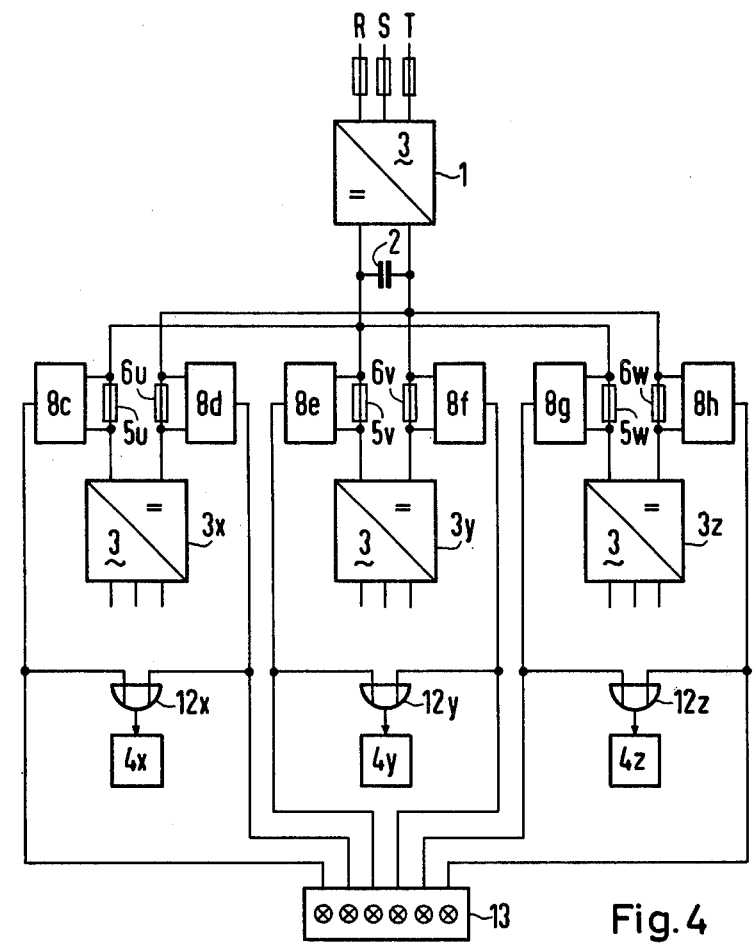
FIG. 4 shows the protection arrangement of FIG. 3 employed for protecting several three-phase inverters connected to an intermediate d-c circuit of a cycloconverter.

FIG. 4 shows a cycloconverter in which a rectifier 1 and an intermediate d-c link 2 are used to feed three 3-phase inverters 3x 3y, 3z, each of which is protected by a protection arrangement similar to protection arrangement employed in FIG. 3 More particularly, electronic voltage monitoring devices 8c, 8e, 8g, 8d, 8f and 8h are used to monitor the voltages across the fuses 5u, 5v, 5w, 6u, 6v and 6w, respectively. The protection signals generated by the pairs of monitoring devices 8c, 8d; 8e, 8f and 8g, 8h are then combined in logic members 12x, 12y and 12z, respectively. The latter members, in turn, control the control devices 4x, 4y and 4z of the three inverters 3x, 3y and 3z such that the valve branches of an inverter are extinguished if its respective control device is receiving a protection signal from its corresponding logic member. The output signals from the monitoring devices 8c to 8h are each additionally fed to an indicating device 13 which directly indicates which fuses of the inverters have blown.

Figure 5:
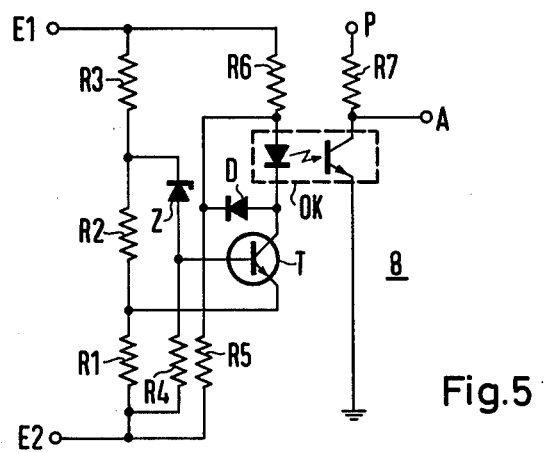
FIG. 5 shows in greater detail an electronic voltage monitoring device which can be employed in the protection arrangements of FIGS. 1 to 4.

FIG. 5 shows a circuit which can be used as the electronic voltage monitoring device employed in the protection arrangements of FIGS. 1 to 4. In the discussion of the circuit of FIG. 5 presented below, it will be assumed that the circuit is to monitor the voltage drop across a fuse as in FIGS. 3 and 4.

The circuit of FIG. 5 comprises input terminals E1 and E2 between which is connected a voltage divider including the resistors R1, R2 and R3. The resistors R1 and R2 are shunted by a series circuit comprising a Zener diode Z and a further resistor R4 for current limiting. If the voltage drop at the resistors R1, R2 exceeds the breakdown voltage of the Zener diode Z, the diode opens a transistor T which, in turn, drives a light-emitting semiconductor element of an opto-electronic coupler OK. The current through the light-emitting semiconductor element of the opto-electronic coupler OK is limited by a further resistor R6. The emitted light radiation acts on the light-sensitive semi-conductor element of the opto-electronic coupler OK, which is connected between a positive potential P and ground. A protection signal appears at the output A.

The resistors R5 and R6 form a voltage divider for the opto-electronic coupler OK. The diode D serves to protect the coupler against overvoltages. A further protection diode may also be arranged between the base and the emitter of the transistor T.

The circuit shown in FIG. 5 can also be used as the monitoring device in the protection arrangements of FIGS. 1 and 2. In such case, the opto-electronic coupler OK is always flooded. As soon as the voltage across the resistors R1, R2 falls below the breakdown voltage of the Zener diode Z, the light-emitting diode in the opto-electronic coupler is extinguished, and the signal at the output A changes.

What is claimed is:

1. A protection arrangement for use in protecting the valves in the valve branches of an inverter, the inverter being of a type having first and second fuses connected in series with its respective first and second d-c inputs, which inputs are adapted to receive a d-c input voltage, and of a type having a control unit for delivering firing pulses to said valve branches, said protection arrangement comprising:
   an electronic voltage monitoring device for monitoring said d-c input voltage by monitoring the voltage across two points each situated between one of said fuses and the d-c input to which said one fuse is connected, said device including means for delivering a protection signal to said control unit for causing said control unit to release firing pulses to said valve branches when said monitored voltage drops below a predetermined value.

2. A protection arrangement in accordance with claim 1 in which the inverter to be protected is included in a cycloconverter which comprises in addition to the inverter, an intermediate d-c link connected to the inverter and a rectifier connected to the intermediate d-c link and supplied by a supply network, and in which said voltage monitoring device further includes:
   a blocking gate adapted to block the delivery of said protection signal for a predetermined period during the starting-up of said cycloconverter.

3. A protection arrangement in accordance with claim 1 in which the inverter to be protected is included in a cycloconverter which comprises, in addition to the inverter, an intermediate d-c link connected to the inverter and a rectifier connected to the intermediate d-c link and supplied by a supply network, and in which said voltage monitoring device further includes:
   a blocking gate adapted to block the delivery of said protection signal as a function of the output signal of a voltage indicator indicating the intermediate link d-c voltage.

4. A protection arrangement in accordance with claim 1 in which said voltage monitoring device monitors said input voltage by monitoring the voltages between said fuses at the points at which said fuses are connected to said d-c inputs.

5. A protection arrangement in accordance with claim 1 in which said monitoring device further includes:
   a threshold member comprising a Zener diode;
   and a potential-free transmission device for converting the output signal of said member to said protection signal, said potential-free transmission device comprising an opto-electronic coupler which includes:
   a light emitting semiconductor element; a light-sensitive semiconductor element; and light guides separating said light-emitting and light-sensitive elements.

6. A protection arrangement for use in protecting the valves in the valve branches of an inverter, the inverter being of a type having first and second fuses connected in series with its respective first and second d-c inputs, which inputs are adapted to receive a d-c input voltage, and of a type having a control unit for delivering firing pulses to said branches, said protection arrangement comprising:
   an electronic voltage monitoring device for monitoring the voltages across each of said fuses and including means for delivering a protection signal to said control unit for causing said control unit to release firing pulses to said valve branches when a voltage being monitored exceeds a predetermined value.

7. A protection arrangement in accordance with claim 6 in which said monitoring device further includes:
   a threshold member comprising a Zener diode;
   and a potential-free transmission device for converting the output signal of said member to said protection signal, said potential-free transmission device comprising an electronic coupler which includes: a light-emitting semiconductor element; a light-sensitive semiconductor element; and light guides separating said light emitting and light sensitive elements.

* * * * *